United States Patent
Mori et al.

(10) Patent No.: US 12,502,881 B2
(45) Date of Patent: Dec. 23, 2025

(54) FOIL TRANSFER DEVICE

(71) Applicant: BROTHER KOGYO KABUSHIKI KAISHA, Nagoya (JP)

(72) Inventors: Kentaro Mori, Kasugai (JP); Hideaki Yamada, Nagoya (JP); Ryutaro Horikawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 785 days.

(21) Appl. No.: 17/838,934

(22) Filed: Jun. 13, 2022

(65) Prior Publication Data

US 2022/0396066 A1    Dec. 15, 2022

(30) Foreign Application Priority Data

Jun. 14, 2021    (JP) .................................. 2021-098491

(51) Int. Cl.
*B32B 41/00* (2006.01)
*B32B 15/04* (2006.01)
*B32B 37/00* (2006.01)

(52) U.S. Cl.
CPC .............. *B32B 41/00* (2013.01); *B32B 15/04* (2013.01); *B32B 37/025* (2013.01)

(58) Field of Classification Search
None
See application file for complete search history.

(56) References Cited

U.S. PATENT DOCUMENTS

| | | | | |
|---|---|---|---|---|
| 5,179,415 A | * | 1/1993 | Ikematsu | G03G 15/2035 399/331 |
| 6,431,244 B1 | * | 8/2002 | Moriguchi | B32B 37/226 156/582 |
| 7,979,000 B2 | * | 7/2011 | Sekina | G03G 21/168 399/121 |
| 2006/0239715 A1 | * | 10/2006 | Lee | G03G 15/2035 399/122 |
| 2019/0094767 A1 | * | 3/2019 | Sakai | G03G 15/2042 |
| 2021/0354500 A1 | * | 11/2021 | Mori | B41F 16/0026 |

FOREIGN PATENT DOCUMENTS

| | | |
|---|---|---|
| JP | S63-047168 A | 2/1988 |
| JP | H01-291309 A | 11/1989 |
| JP | H04-245276 A | 9/1992 |
| JP | 2008-164469 A | 7/2008 |

(Continued)

OTHER PUBLICATIONS

Japan Patent Office, Notice of Reasons for Refusal issued in Japanese Patent Application No. 2021-098491, dated Nov. 19, 2024 (12 pages).

*Primary Examiner* — Michael N Orlando
*Assistant Examiner* — Abhishek A Patwardhan
(74) *Attorney, Agent, or Firm* — Baker Botts L.L.P.

(57) ABSTRACT

A foil transfer device is configured to dispose a sheet on a foil film containing a foil and transfer the foil onto the sheet. The foil transfer device includes a heating member configured to heat the foil film and the sheet, a pressure member configured to nip the foil film and the sheet with the heating member, a first temperature sensor, and a controller. The controller determines whether the first temperature sensor has failed based on a voltage value of the first temperature sensor.

19 Claims, 11 Drawing Sheets

(56) References Cited

FOREIGN PATENT DOCUMENTS

| | | |
|---|---|---|
| JP | 2012-233987 A | 11/2012 |
| JP | 2013-242225 A | 12/2013 |
| JP | 2014-025867 A | 2/2014 |
| JP | 2014-139638 A | 7/2014 |
| JP | 2014-185992 A | 10/2014 |
| JP | 2020-121788 A | 8/2020 |

* cited by examiner

FOIL TRANSFER DEVICE

REFERENCE TO RELATED APPLICATIONS

This present application claims priority from Japanese Patent Application No. 2021-098491 filed on Jun. 14, 2021. The entire contents of the priority application are incorporated herein by reference.

BACKGROUND ART

The present invention relates to a foil transfer device that transfers a foil onto a sheet.

In related art, there has been known a foil transfer device including a feed reel around which a foil film is rolled, a roll-up reel that rolls up the foil film, a heating roller that heats the foil film and a sheet, and a pressure roller that nips the foil film and the sheet with the heating roller. In this foil transfer device, by opening a cover, the foil film may be replaced or the jammed sheet may be removed. A controller in the foil transfer device locks the cover in a case where a detected temperature is equal to or larger than a threshold value and unlocks the cover in a case where a detected temperature is smaller than the threshold value based on a temperature sensor.

However, the foil transfer device according to the related art cannot determine a failure of the temperature sensor. Therefore, in a case where the temperature sensor fails, a controller cannot perform control according to the failure. For example, in a case where the temperature sensor fails, the controller cannot appropriately control locking and unlocking of the cover.

Therefore, an object of the present invention is to provide a foil transfer device capable of determining a failure of a temperature sensor.

DESCRIPTION

A foil transfer device for solving the above-mentioned matters is a foil transfer device configured to dispose a sheet on a foil film containing a foil and transfer the foil onto the sheet, the foil transfer device including: a heating member configured to heat the foil film and the sheet; a pressure member configured to nip the foil film and the sheet with the heating member; a first temperature sensor; and a controller. The controller determines whether the first temperature sensor has failed based on a voltage value of the first temperature sensor.

According to this configuration, the controller may determine whether the first temperature sensor has failed based on the voltage value of the first temperature sensor.

In the above configuration, the controller may determine that the first temperature sensor has failed in a case where the voltage value of the first temperature sensor is out of a predetermined range.

In the above configuration, the controller may determine that the first temperature sensor has failed in a case where a state in which the voltage value of the first temperature sensor is out of the predetermined range continues for a predetermined time.

According to this configuration, even in a case where the controller determines that the voltage value of the first temperature sensor is out of the predetermined range, the controller determines that the first temperature sensor has not failed unless the state out of the predetermined range continues for the predetermined time, and thus it is possible to prevent the controller from erroneously determining that the first temperature sensor has failed.

In the above configuration, the controller may convert the voltage value of the first temperature sensor into a temperature, and determine a failure of the first temperature sensor based on the converted temperature.

In the above configuration, in a case where the voltage value of the first temperature sensor is converted into the temperature, the controller may perform the conversion with reference to a table indicating a relationship between the voltage value and the temperature.

In the above configuration, the foil transfer device may include: a housing main body having an opening; a cover movable between a closed position where the opening is closed and an open position where the opening is opened; and a lock mechanism configured to lock the cover at the closed position, and the controller may control the lock mechanism based on the voltage value of the first temperature sensor.

In the above configuration, the controller may stop controlling the lock mechanism based on the voltage value of the first temperature sensor in a case where it is determined that the first temperature sensor has failed.

In the above configuration, the foil transfer device may further include a second temperature sensor disposed closer to the heating member than the first temperature sensor and configured to detect a temperature of the heating member, and the controller may control the lock mechanism based on a voltage value of the second temperature sensor in a case where it is determined that the first temperature sensor has failed.

According to this configuration, the controller may appropriately control the lock mechanism based on the second temperature sensor even in a case where the first temperature sensor fails.

In the above configuration, the foil transfer device may further include a metal plate facing the heating member, the metal plate extending in a width direction of the foil film and located downstream of the heating member in a conveyance direction of the sheet, and the first temperature sensor may be disposed on the metal plate.

In the above configuration, the first temperature sensor may be disposed so as not to be in contact with the heating member, and the second temperature sensor may be disposed in contact with the heating member.

In the above configuration, the controller may control the lock mechanism to lock the cover in a case where the temperature indicated by the voltage value of the first temperature sensor is equal to or larger than a first threshold value, and control the lock mechanism to unlock the cover in a case where the temperature indicated by the voltage value of the first temperature sensor is smaller than a second threshold value that is smaller than the first threshold value.

According to this configuration, by setting the second threshold value to be smaller than the first threshold value, it is possible to prevent frequent repetition of locking and unlocking of the cover.

In the above configuration, the controller may determine whether the first temperature sensor has failed before foil transfer for transferring the foil onto the sheet is performed after a power supply of the foil transfer device is turned on.

In the above configuration, the controller may determine whether the first temperature sensor has failed during the foil transfer for transferring the foil onto the sheet.

In the above configuration, the controller may determine whether the first temperature sensor has failed after the foil transfer for transferring the foil onto the sheet is performed.

In the above configuration, the controller may always determine whether the first temperature sensor has failed at predetermined time intervals while the power supply of the foil transfer device is turned on.

In the above configuration, the foil transfer device may further include the second temperature sensor disposed closer to the heating member than the first temperature sensor, and the voltage value of the first temperature sensor may be different from the voltage value of the second temperature sensor at 0° C.

In the above configuration, the foil transfer device may further include the second temperature sensor disposed closer to the heating member than the first temperature sensor, and a difference between the voltage value of the first temperature sensor at 0° C. and the voltage value of the first temperature sensor at 1° C. may be larger than a difference between the voltage value of the second temperature sensor at 0° C. and the voltage value of the second temperature sensor at 1° C.

In the above configuration, the voltage value of the first temperature sensor at 0° C. may be 0.1V or larger.

In the above configuration, the foil transfer device may further include the second temperature sensor disposed closer to the heating member than the first temperature sensor, each of the first temperature sensor and the second temperature sensor may be formed of a thermistor whose resistance value decreases as a temperature increases, a voltage divider may be made of the first temperature sensor and a first resistor, another voltage divider may be made of the second temperature sensor and a second resistor, the controller may acquire a potential between the first temperature sensor and the first resistor as the voltage value of the first temperature sensor, and a resistance value of the first resistor may be larger than a resistance value of the second resistor.

Advantageous Effects of Invention

According to the present invention, a failure of the temperature sensor may be determined.

BRIEF DESCRIPTION OF DRAWINGS

FIG. 3A shows a state in which the lock lever is restricted to a lock position, FIG. 3B shows a state in which the lock lever is not restricted, and FIG. 3C shows a state in which the lock lever is swung to a non-lock position.

FIG. 8 is a flowchart showing processing related to locking of the cover executed by a controller after power is turned on.

DESCRIPTION OF EMBODIMENTS

The embodiment of the present invention will be described in detail with reference to the drawings as appropriate.

Figure 1:
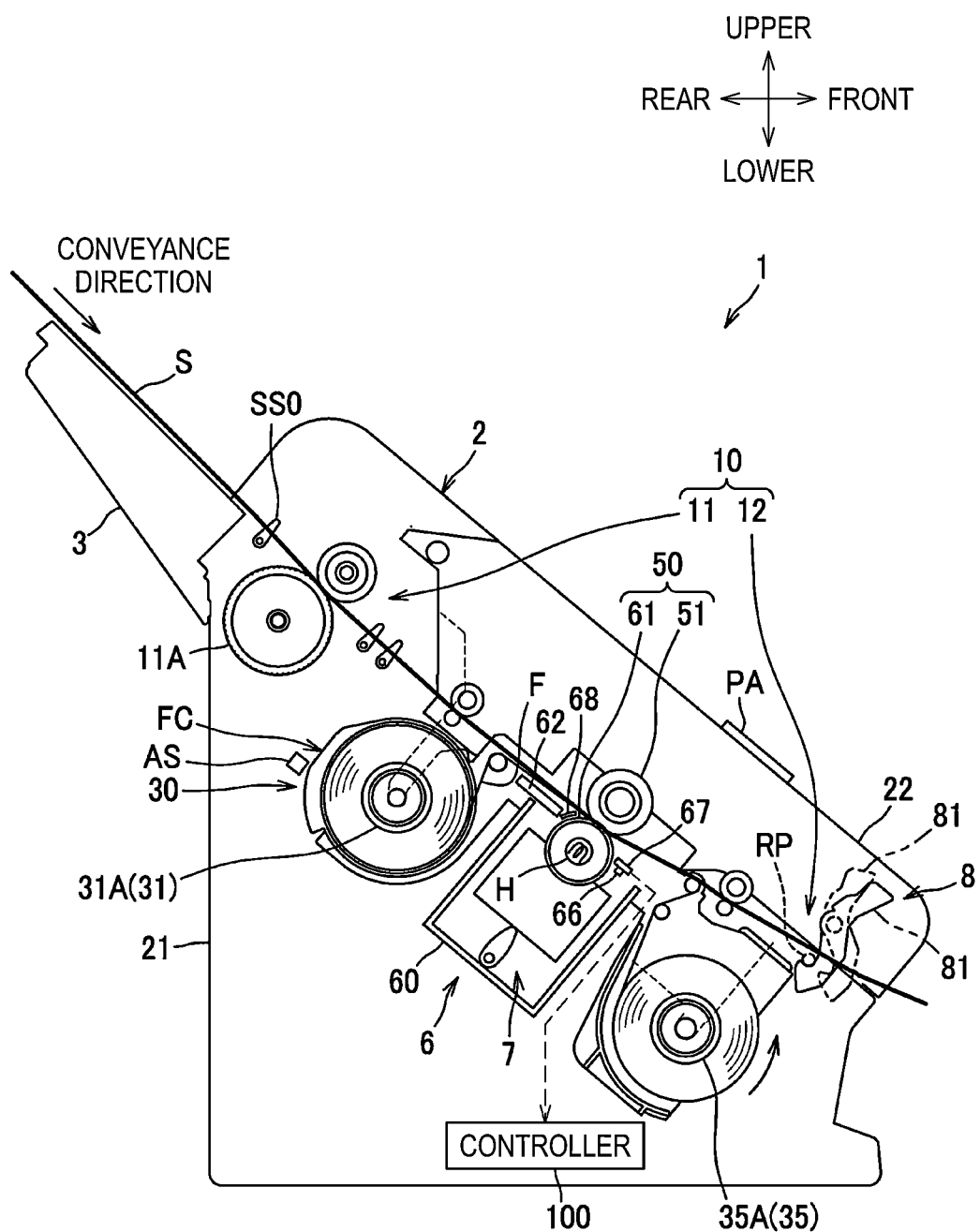
FIG. 1 is a view showing a foil transfer device according to an embodiment of the present invention.

In the following description, directions will be described as directions shown in FIG. 1. That is, a right side in FIG. 1 is referred to as "front", a left side in FIG. 1 is referred to as "rear", a front side of paper of FIG. 1 is referred to as "left", and a back side of the paper of FIG. 1 is referred to as "right". In addition, upper and lower sides in FIG. 1 are referred to as "upper and lower".

As shown in FIG. 1, a foil transfer device 1 is a device that forms a toner image on a sheet S by an image forming device such as a laser printer and then transfers a foil such as a gold foil onto the toner image on the sheet S. That is, the foil transfer device 1 forms a foil image on the sheet S by transferring the foil onto the toner image on the sheet S. The foil transfer device 1 includes a housing 2, a sheet tray 3, a sheet conveyance unit 10, a film feed unit 30, a transfer unit 50, a controller 100, and an operation panel PA.

The housing 2 is made of resin or the like, and includes a housing main body 21 and a cover 22. The housing main body 21 has an opening 21A in an upper portion thereof (see FIG. 2). The opening 21A is an opening for attaching and detaching a film cartridge FC to be described later to and from the housing main body 21. The cover 22 is a member that opens and closes the opening 21A. A rear end portion of the cover 22 is rotatably supported by the housing main body 21. The cover 22 is movable between a closed position where the opening 21A is closed (position in FIG. 1) and an open position where the opening 21A is opened (position in FIG. 2).

The foil transfer device 1 includes a lock mechanism 8 that locks the cover 22 at the closed position. The lock mechanism 8 will be described in detail later.

The sheet tray 3 is a tray on which the sheet S such as a sheet or an OHP film is placed. The sheet tray 3 is provided at a rear portion of the housing 2. The sheet S is placed on the sheet tray 3 with a surface on which the toner image is formed facing downward. The sheet tray 3 is provided with a sheet tray sensor SS0 that detects the sheet S placed on the sheet tray 3. The sheet tray sensor SS0 is turned on in a case where the sheet S is placed on the sheet tray 3, and is turned off in a case where the sheet S is not placed on the sheet tray 3.

The sheet conveyance unit 10 includes a sheet feed mechanism 11 and a sheet discharge mechanism 12. The sheet feed mechanism 11 is a mechanism that conveys the sheets S on the sheet tray 3 one by one toward the transfer unit 50. The sheet feed mechanism 11 includes a pickup roller 11A and a conveyance roller.

The sheet discharge mechanism 12 is a mechanism that discharges the sheet S that has passed through the transfer unit 50 to outside of the housing 2. The sheet discharge mechanism 12 includes a plurality of conveyance rollers.

The film feed unit 30 is a portion that feeds a foil film F so as to dispose the sheet S conveyed from the sheet feed mechanism 11 on the foil film. The film feed unit 30 includes the film cartridge FC and a drive source such as a motor (not shown).

Figure 2:
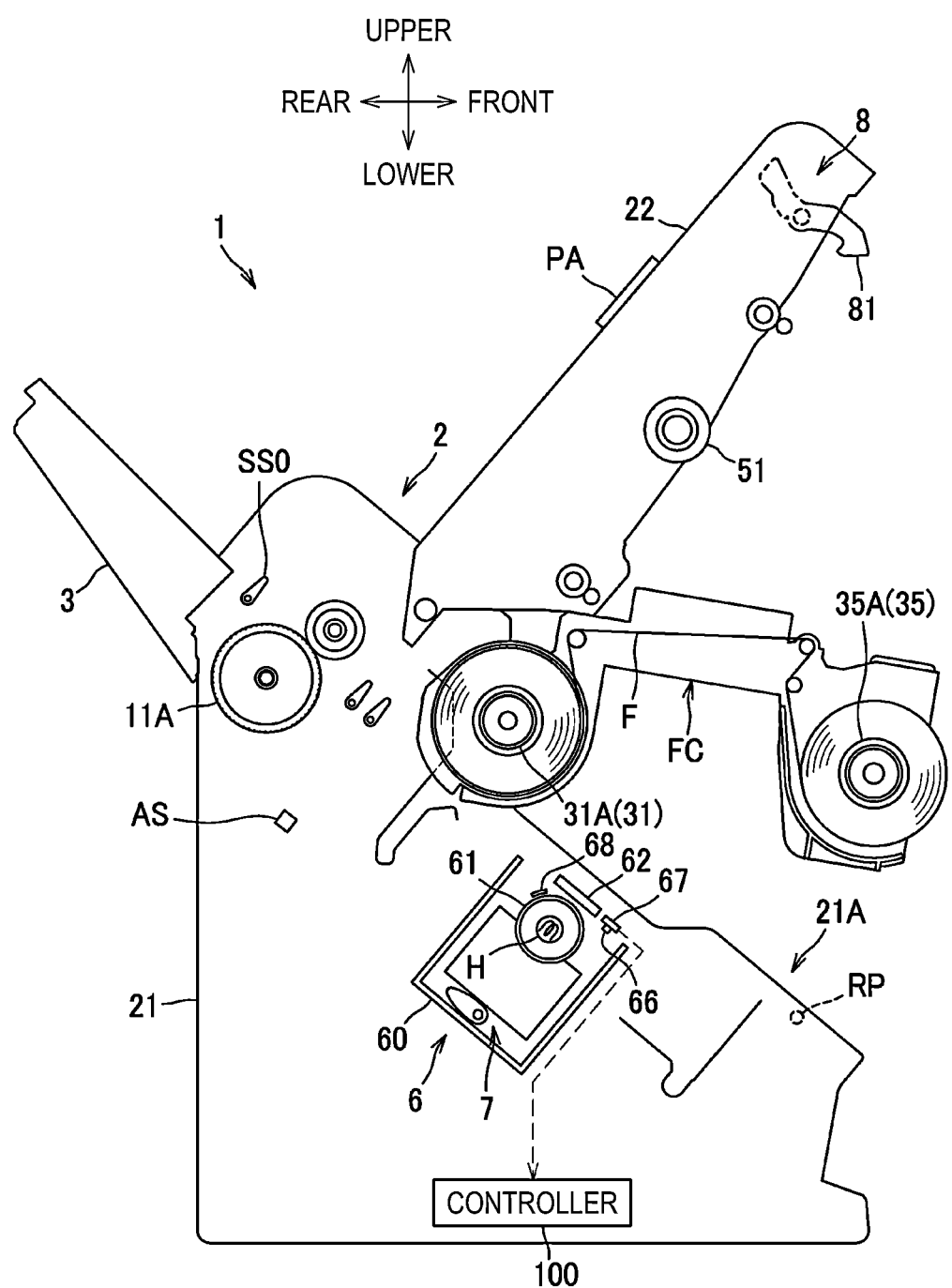
FIG. 2 is a view showing a state in which a cover of the foil transfer device is opened.

As shown in FIG. 2, the film cartridge FC is attachable to and detachable from the housing main body 21 through the opening 21A in a direction orthogonal to an axial direction of a feed reel 31 to be described later. The film cartridge FC includes the feed reel 31 and a roll-up reel 35. The foil film F is rolled around the feed reel 31.

The foil film F is a film including a plurality of layers. Specifically, the foil film F includes a support layer and a supported layer. The support layer is a tape-shaped transparent base material made of a polymer material, and supports the supported layer. The supported layer includes, for example, a release layer, a transfer layer, and an adhesive layer. The release layer is a layer for facilitating release of the transfer layer from the support layer, and is disposed between the support layer and the transfer layer. The release layer contains a transparent material that is easily released from the support layer, for example, a wax-based resin.

The transfer layer is a layer to be transferred onto the toner image, and contains a foil. The foil is a thin metal such as gold, silver, copper, or aluminum. The transfer layer contains a coloring material such as gold, silver, or red, and a thermoplastic resin. The transfer layer is disposed between the release layer and the adhesive layer. The adhesive layer is a layer for facilitating adhesion of the transfer layer to the toner image. The adhesive layer contains a material that easily adheres to the toner image heated by the transfer unit 50 to be described later, for example, a vinyl chloride resin or an acrylic resin.

The feed reel 31 is made of resin or the like, and includes a feed shaft portion 31A around which the foil film F is rolled. One end of the foil film F is fixed to the feed shaft portion 31A. The foil film F is rolled around the feed reel 31 with the support layer on an outer side and the supported layer on an inner side.

The roll-up reel 35 is made of resin or the like, and includes a roll-up shaft portion 35A that rolls up the foil film F. The other end of the foil film F is fixed to the roll-up shaft portion 35A. The foil film F is rolled around the roll-up reel 35 with the support layer on an outer side and the supported layer on an inner side.

For convenience, FIG. 1 and the like show a state in which the foil film F is maximally rolled around both the feed reel 31 and the roll-up reel 35.

In a state in which the film cartridge FC is mounted on the foil transfer device 1, the roll-up reel 35 is rotationally driven in a counterclockwise direction in the drawing by the drive source (not shown). In a case where the roll-up reel 35 rotates, the foil film F rolled around the feed reel 31 is drawn out, and the drawn out foil film F is rolled up by the roll-up reel 35. Specifically, during foil transfer, the foil film F is fed out by a pressure roller 51 and a heating roller 61 to be described later, so that the foil film F is drawn out from the feed reel 31. Then, the foil film F fed out from the pressure roller 51 and the heating roller 61 is rolled up by the roll-up reel 35.

The transfer unit 50 is a portion that transfers the transfer layer onto the toner image formed on the sheet S by heating and pressing the sheet S and the foil film F in an overlapped state. The transfer unit 50 includes the pressure roller 51 serving as an example of a pressure member, and a heating roller 61 serving as example of a heating member. The transfer unit 50 heats and presses the sheet S and the foil film F in an overlapped manner at a nip portion between the pressure roller 51 and the heating roller 61.

The pressure roller 51 is a roller in which a cylindrical metal insert is covered with a rubber layer made of silicon rubber. The pressure roller 51 is disposed on an upper side of the foil film F and is capable of coming into contact with a back surface of the sheet S (a surface opposite to the surface on which the toner image is formed).

The pressure roller 51 is disposed on the cover 22. Both end portions of the pressure roller 51 are rotatably supported by the cover 22. The pressure roller 51 nips the sheet S and the foil film F with the heating roller 61, and is driven to rotate by the drive source (not shown) to rotate the heating roller 61.

The heating roller 61 is disposed in the housing main body 21. The heating roller 61 is a rotatable roller in which a heater H is disposed inside a metal tube formed in a cylindrical shape, and heats the foil film F and the sheet S. The heating roller 61 is disposed below the foil film F and is in contact with the foil film F.

The heating roller 61 is supported by a heating unit 6 so as to be rotatable and movable in an upper-lower direction. The heating unit 6 includes a fixed frame 60 constituting an outer frame, a shutter 62, and a contact and separation mechanism 7, in addition to the heating roller 61.

The shutter 62 is guided by the fixed frame 60 and is slidable between a closed position and an open position in conjunction with the contact and separation mechanism 7. As shown in FIG. 1, in a case where the heating roller 61 is located at a contact position, the shutter 62 is located at the open position different from a position between the heating roller 61 and the pressure roller 51. As shown in FIG. 2, in a case where the heating roller 61 is located at a separation position, the shutter 62 is located at the closed position, which is the position between the pressure roller 51 and the heating roller 61, and covers the heating roller 61.

The contact and separation mechanism 7 is a mechanism that moves the heating roller 61 between a pressure contact position where the heating roller 61 is in pressure contact with the pressure roller 51 and a separation position where the heating roller 61 is separated from the pressure roller 51. In a state in which the film cartridge FC is mounted, in a case where the heating roller 61 is located at the pressure contact position, the heating roller 61 comes into contact with the foil film F. In a case where the cover 22 is closed, the contact and separation mechanism 7 moves the heating roller 61 to a contact position where the heating roller 61 comes into contact with the foil film F in accordance with a timing at which the sheet S is fed to the transfer unit 50. In a case where the cover 22 is opened or in a case where foil transfer is not performed on the sheet S in the transfer unit 50, the contact and separation mechanism 7 positions the heating roller 61 at a separation position where the heating roller 61 is separated from the foil film F.

In the foil transfer device 1 configured as described above, the sheets S placed on the sheet tray 3 with front surfaces of the sheets S facing downward are conveyed one by one toward the transfer unit 50 by the sheet feed mechanism 11. The sheet S is disposed on the foil film F fed from the feed reel 31 on an upstream side of the transfer unit 50 in a conveyance direction of the sheet S (hereinafter, simply referred to as a "conveyance direction"), and is conveyed to the transfer unit 50 in a state in which the toner image of the sheet S and the foil film F are in contact with each other.

In the transfer unit 50, in a case where the sheet S and the foil film F pass through the nip portion between the pressure roller 51 and the heating roller 61, the sheet S and the foil film F are heated and pressed by the heating roller 61 and the pressure roller 51, and the foil is transferred onto the toner image. On a downstream side of the transfer unit 50, the foil film F is released from the sheet S.

The foil film F released from the sheet S is rolled up by the roll-up reel 35. On the other hand, the sheet S from which the foil film F is released is discharged to the outside of the housing 2 by the sheet discharge mechanism 12 in a state in which the front surface to which the foil is transferred faces downward.

The controller 100 includes a central processing unit (CPU), a random access memory (RAM), a read only memory (ROM), and an input and output circuit, and controls the foil transfer device 1 by performing various types of arithmetic processing based on programs and data stored in the ROM or the like. An operation of the controller 100 will be described in detail later.

As shown in FIG. 1, the foil transfer device 1 includes a cartridge sensor AS. The cartridge sensor AS may detect whether the film cartridge FC is mounted on the housing main body 21.

Figure 3A:
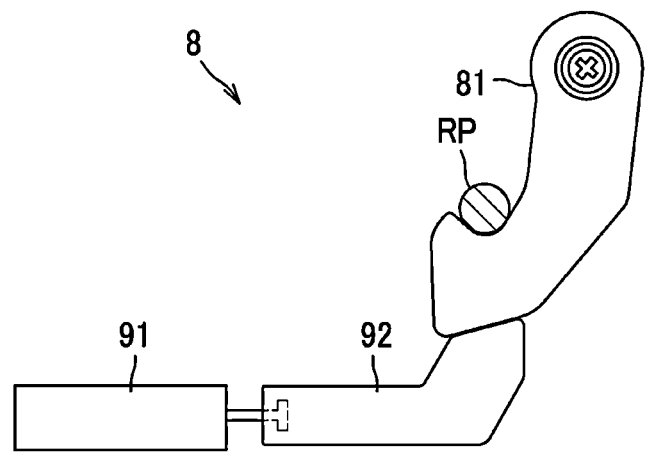
FIGS. 3A to 3C are side views showing a structure around a lock lever.

Here, the lock mechanism 8 that locks the cover 22 will be described in detail. As shown in FIG. 3A, the lock mechanism 8 includes a lock lever 81, an actuator 91, a swing restriction member 92, and a lock pin RP. In the present embodiment, the lock lever 81 is located at a front end portion of the cover 22, and the actuator 91, the swing restriction member 92, and the lock pin RP are located in the housing main body 21 (see FIG. 2).

Figure 3B:
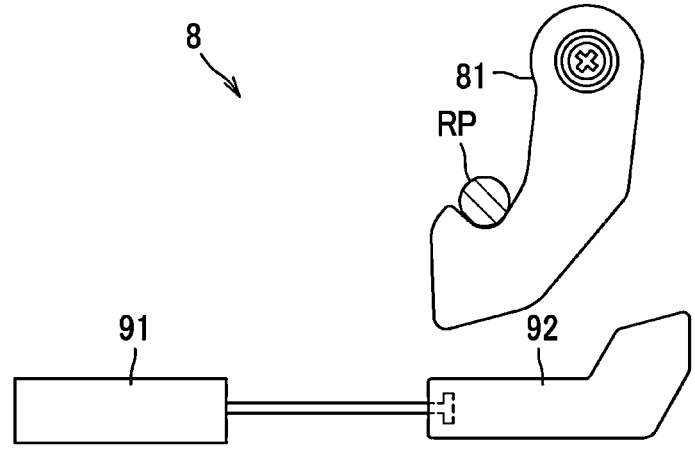
Figure 3C:
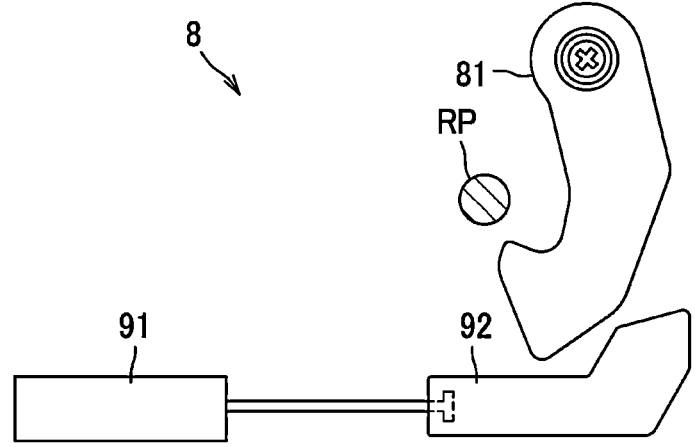

The lock lever 81 is swingable between a lock position where the cover 22 is locked at the closed position (see FIG. 3A) and an unlock position where the cover 22 is not locked (see FIG. 3C).

Figure 4:
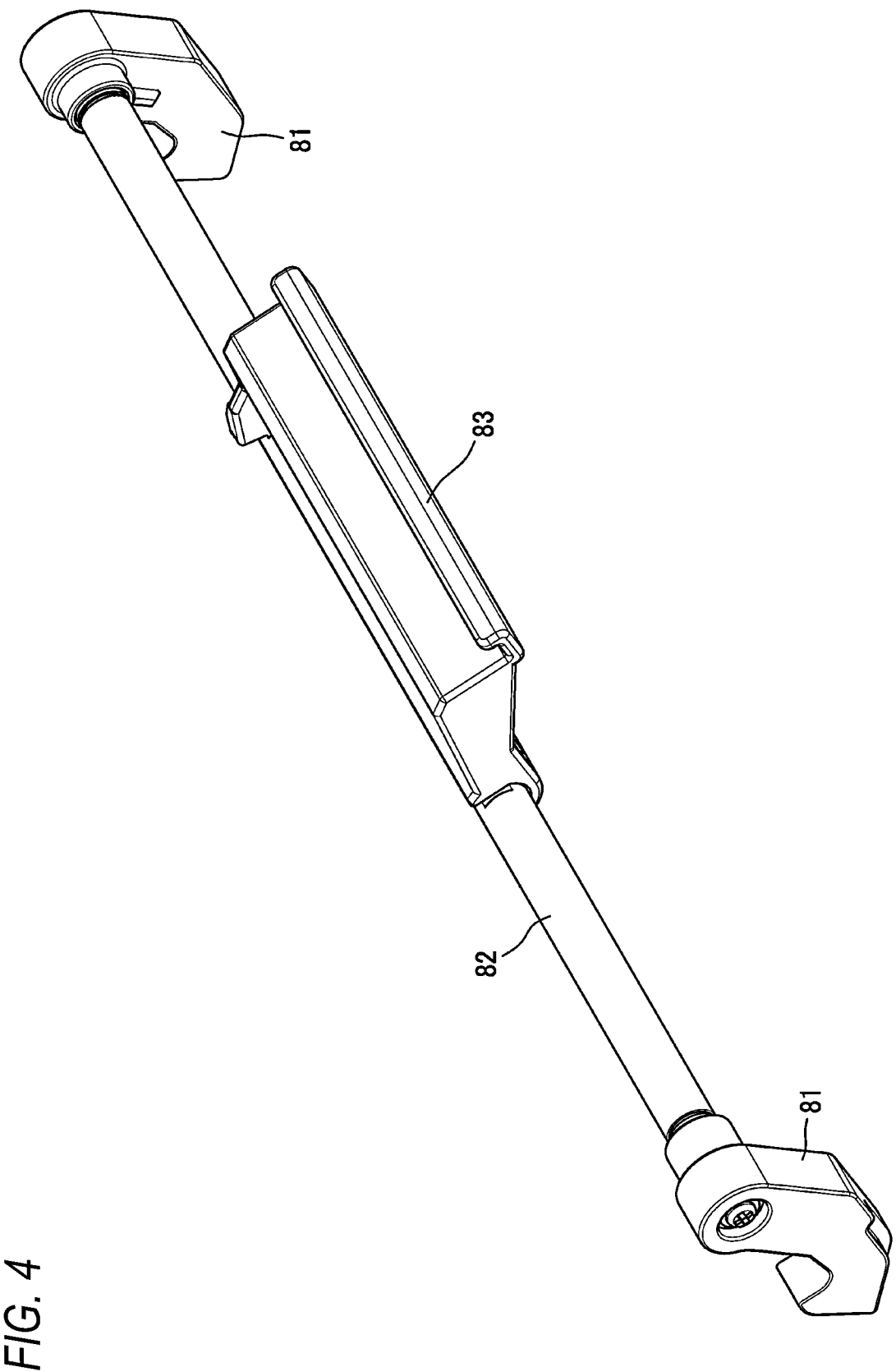
FIG. 4 is a perspective view of the lock lever.

As shown in FIG. 4, one lock lever 81 is provided at each of both ends of a cylindrical shaft 82. The shaft 82 is rotatably supported by the cover 22. A handle 83 to be operated by a user is provided at an axial center portion of the shaft 82. The lock levers 81 and the handle 83 are fixed to the shaft 82. Thereby, in a case where the user rotates the handle 83, the lock levers 81 rotate together with the shaft 82.

As shown in FIG. 3A, a tip end portion of the lock lever 81 has a hook shape, and the tip end portion may be engaged with the lock pin RP. In a state in which the cover 22 is located at the closed position, the lock lever 81 is movable between the lock position where the lock lever 81 is engageable with the lock pin RP (position in FIG. 3A) and the non-lock position where the lock lever 81 is disengaged from the lock pin RP (position in FIG. 3C).

The swing restriction member 92 is movable between a restriction position shown in FIG. 3A and a non-restriction position shown in FIGS. 3B and 3C. As shown in FIG. 3A, the swing restriction member 92 restricts the lock lever 81 from swinging from the lock position to the non-lock position by coming into contact with the lock lever 81 at the restriction position.

As shown in FIGS. 3B and 3C, the swing restriction member 92 does not restrict the lock lever 81 from swinging from the lock position to the non-lock position by separating from the lock lever 81 at the non-restriction position.

The actuator 91 is for sliding the swing restriction member 92 between the restriction position and the non-restriction position.

Here, a first temperature sensor 66 and a second temperature sensor 68 provided in the heating unit 6 will be described. As shown in FIGS. 1 and 2, the heating unit 6 further includes the first temperature sensor 66, a metal plate 67, and the second temperature sensor 68.

Figure 5:
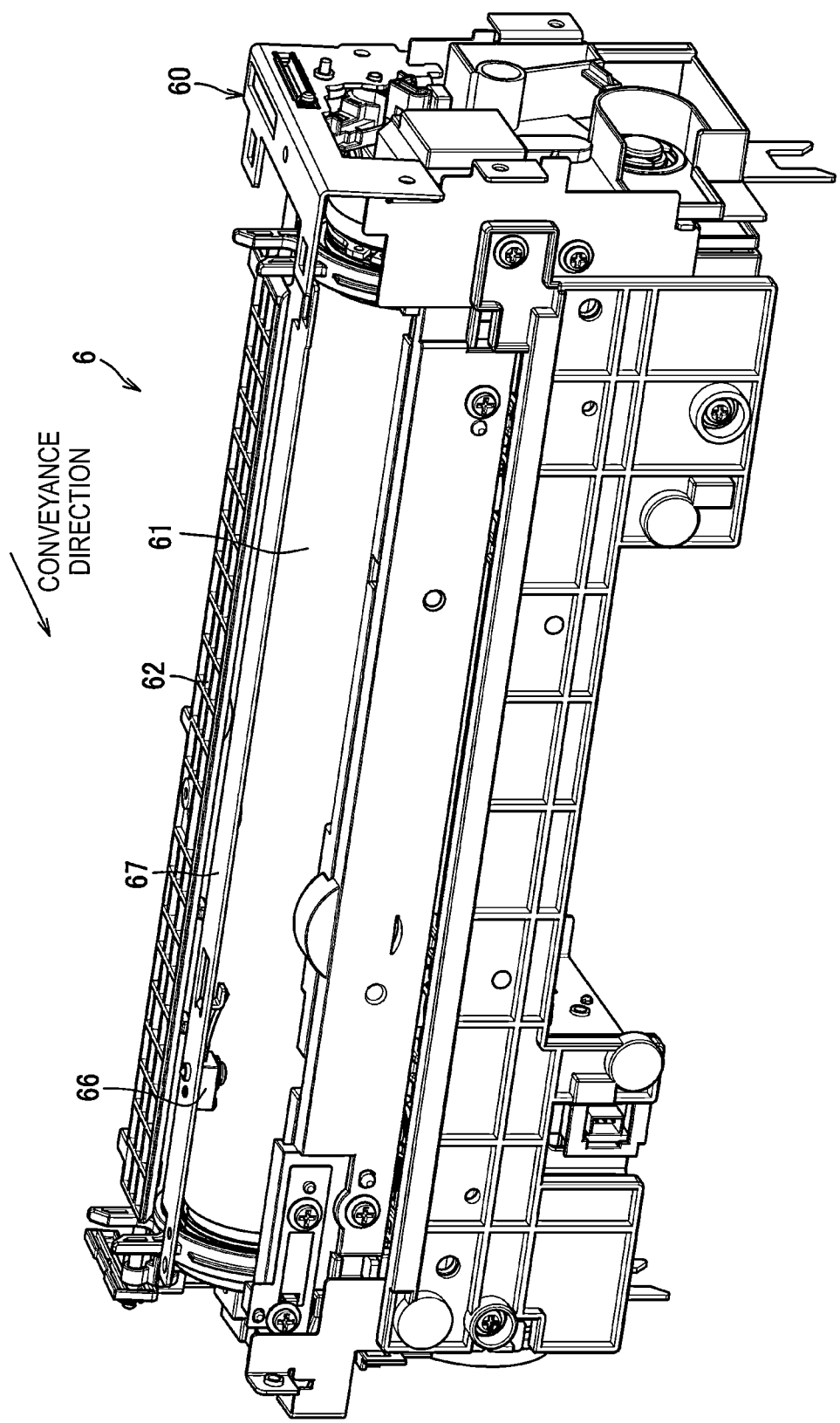
FIG. 5 is a perspective view showing a heating unit, and shows a position of a first temperature sensor.

The metal plate 67 is located downstream of the heating roller 61 in the conveyance direction. As shown in FIG. 5, the metal plate 67 extends in a width direction of the foil film F. The metal plate 67 faces the heating roller 61.

The first temperature sensor 66 is disposed on a lower surface of the metal plate 67. That is, the first temperature sensor 66 is disposed on a surface of the metal plate 67 on a heating roller 61 side, and is located downstream of the heating roller 61 in the conveyance direction. The first temperature sensor 66 is disposed so as not to be in contact with the heating roller 61. A distance from the heating roller 61 to the first temperature sensor 66 is substantially equal to a distance from the heating roller 61 to the shutter 62. The first temperature sensor 66 is for estimating a temperature of the shutter 62 and executing cover lock and unlock processing of the cover 22.

Figure 6:
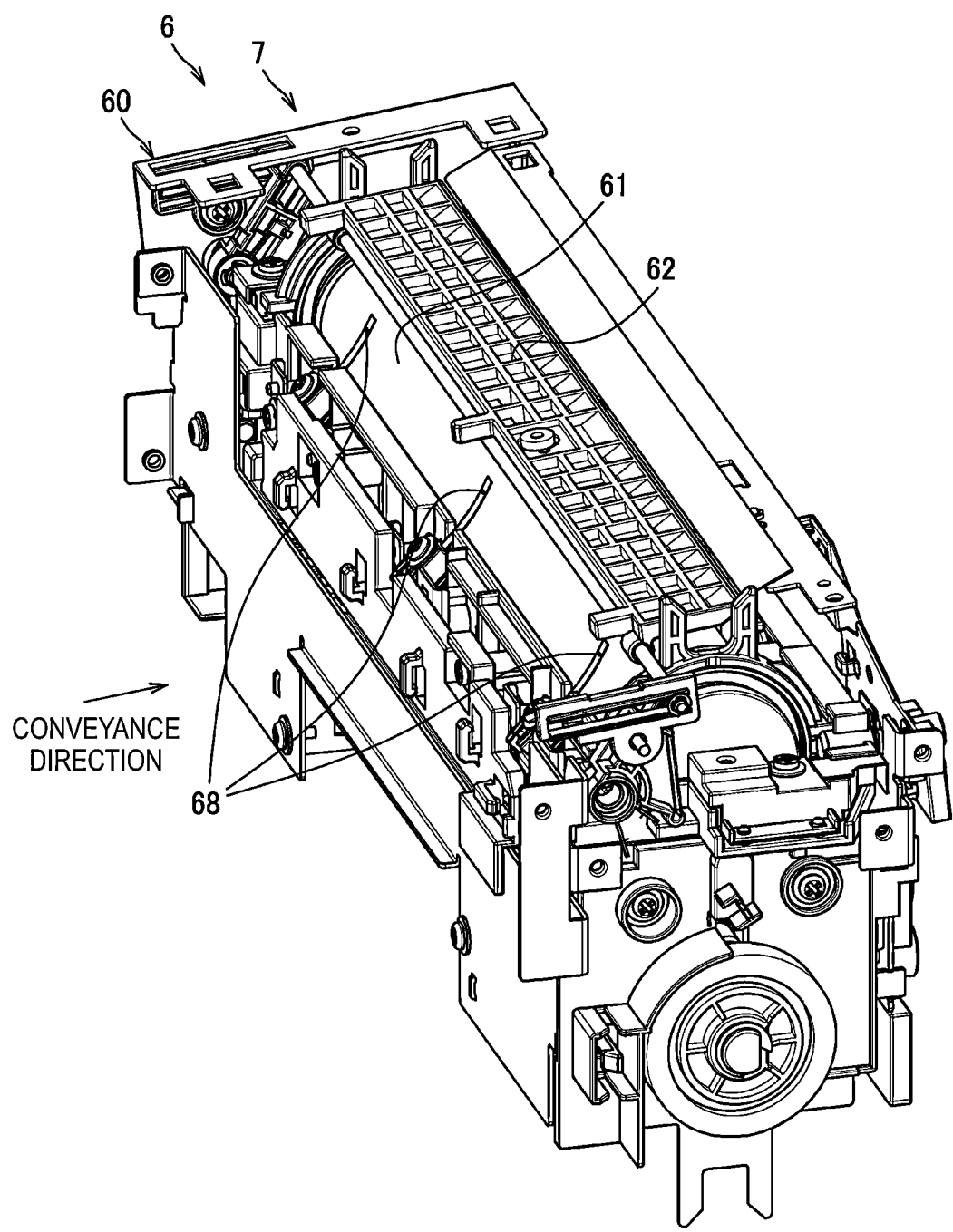
FIG. 6 is a perspective view showing the heating unit viewed from a direction different from that of FIG. 5, and shows a position of a second temperature sensor.

The second temperature sensor 68 is located upstream of the heating roller 61 in the conveyance direction. As shown in FIG. 6, in the present embodiment, a plurality of second temperature sensors 68 are disposed, and the plurality of second temperature sensors 68 are disposed in the width direction of the foil film F. The second temperature sensor 68 is disposed in contact with the heating roller 61. The second temperature sensor 68 is disposed closer to the heating roller 61 than the first temperature sensor 66, and detects a temperature of the heating roller 61. The second temperature sensor 68 is for detecting a temperature of the heating roller 61 to control the temperature of the heating roller 61.

Figure 7A:
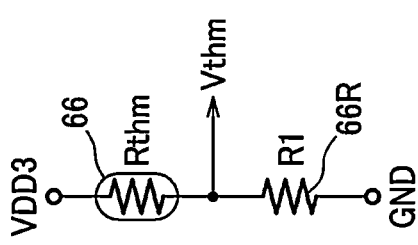
FIG. 7A is a circuit diagram of the first temperature sensor.
Figure 7B:
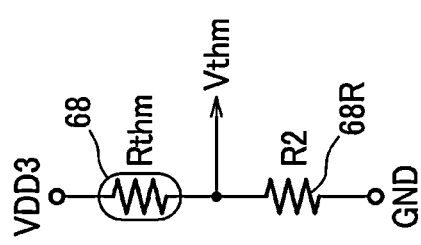
FIG. 7B is a circuit diagram of the second temperature sensor.

Each of the first temperature sensor 66 and the second temperature sensor 68 is formed of a thermistor whose resistance value decreases as the temperature increases. As shown in FIG. 7A, a voltage divider is formed by the first temperature sensor 66 and a first resistor 66R. As shown in FIG. 7B, a voltage divider is formed by the second temperature sensor 68 and a second resistor 68R. In the present embodiment, a resistance value R1 of the first resistor 66R is larger than a resistance value R2 of the second resistor 68R. The first temperature sensor 66 is located closer to an input voltage VDD3 than the first resistor 66R between the input voltage VDD3 and a ground GND. The second temperature sensor 68 is located closer to the input voltage VDD3 than the second resistor 68R between the input voltage VDD3 and the ground GND.

Figure 7C:
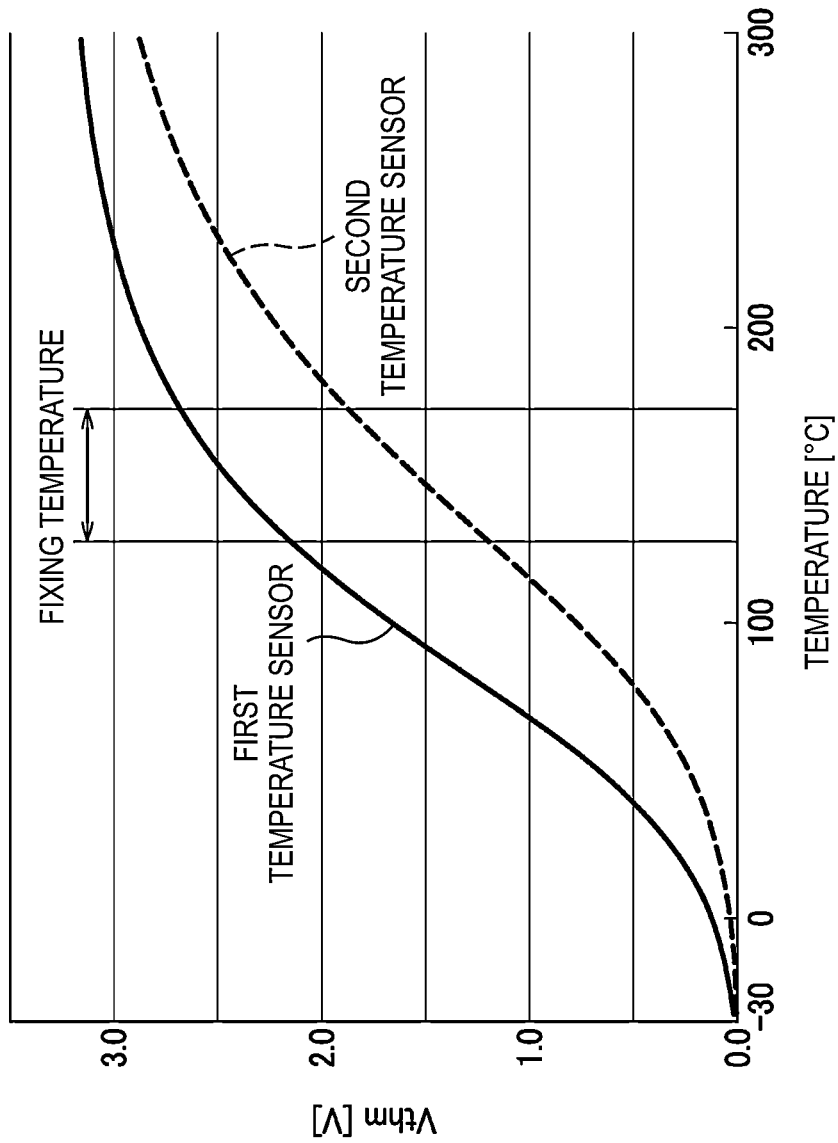
FIG. 7C is a graph showing relationships between Vthms and temperatures of the first temperature sensor and the second temperature sensor.

FIG. 7C is a graph showing relationships between temperatures and voltage values Vthm output from the first temperature sensor 66 and the second temperature sensor 68. When a voltage value Vthm of the first temperature sensor 66 is converted into a temperature T1, the controller 100 performs conversion with reference to a table indicating a relationship between the voltage value Vthm and the temperature T1 according to the graph in FIG. 7C.

The controller 100 acquires a potential between the first temperature sensor 66 and the first resistor 66R as the voltage value Vthm of the first temperature sensor 66. The controller 100 converts the voltage value Vthm acquired from the first temperature sensor 66 into the temperature T1. The controller 100 acquires a potential between the second temperature sensor 68 and the second resistor 68R as the voltage value Vthm of the second temperature sensor 68. The controller 100 converts the voltage value Vthm acquired from the second temperature sensor 68 into a temperature T2.

At 0° C., the voltage value Vthm of the first temperature sensor 66 is different from the voltage value Vthm of the second temperature sensor 68. In the present embodiment, at each temperature, for example, 0° C., 100° C., 200° C., and 300° C., the voltage value Vthm of the first temperature sensor 66 is a value larger than the voltage value Vthm of the second temperature sensor 68.

Between 0° C. and 1° C., a slope of a graph of the first temperature sensor 66 is larger than a slope of a graph of the second temperature sensor 68. In other words, a difference between the voltage value Vthm of the first temperature sensor 66 at 0° C. and the voltage value Vthm of the first temperature sensor 66 at 1° C. is larger than a difference between the voltage value Vthm of the second temperature sensor 68 at 0° C. and the voltage value Vthm of the second temperature sensor 68 at 1° C. On the other hand, at a fixing temperature (for example, 130° C. to 170° C.), a slope of the graph of the second temperature sensor 68 is larger than a slope of the graph of the first temperature sensor 66.

The voltage value Vthm of the first temperature sensor 66 at 0° C. is 0.1V or larger. On the other hand, the voltage value Vthm of the second temperature sensor 68 at 0° C. is smaller than 0.1V.

Next, control on the lock mechanism 8 under the controller 100 will be described.

After a power supply of the foil transfer device 1 is turned on, the controller 100 repeatedly executes the cover lock and unlock processing and sensor failure determination while the power supply is turned on.

As the cover lock and unlock processing, in a case where the temperature T1 indicated by the voltage value Vthm of the first temperature sensor 66 is equal to or larger than a first threshold value, the controller 100 controls the lock mechanism 8 to lock the cover 22. The first threshold value is, for example, 85° C.

As the cover lock and unlock processing, in a case where the temperature T1 indicated by the voltage value Vthm of the first temperature sensor 66 is smaller than a second threshold value that is smaller than the first threshold value, the controller 100 controls the lock mechanism 8 to unlock the cover 22. The second threshold value is, for example, 75° C. A difference between the first threshold value and the second threshold value is preferably 5° C. to 15° C.

While the cover 22 is open, the controller 100 does not lock the cover 22 regardless of the temperature T1 of the first temperature sensor 66. The controller 100 determines whether the cover 22 is located at the closed position or the open position by a cover sensor (not shown), and in a case where the cover 22 is located at the open position, the controller 100 does not lock the cover 22 regardless of the temperature T1 of the first temperature sensor 66.

The controller 100 locks the cover 22 and does not unlock the cover 22 regardless of the temperature T1 of the first temperature sensor 66 while the foil transfer for transferring the foil to the sheet S is being performed.

As the sensor failure determination, the controller 100 always determines whether the first temperature sensor 66 has failed at predetermined time intervals while the power supply of the foil transfer device 1 is turned on.

Specifically, the controller 100 determines whether the first temperature sensor 66 has failed before the foil transfer for transferring the foil to the sheet is performed, during the foil transfer, or after the foil transfer is performed, after the power supply of the foil transfer device 1 is turned on.

In the present embodiment, the controller 100 converts the voltage value Vthm of the first temperature sensor 66 into the temperature T1, and determines a failure of the first temperature sensor 66 based on the converted temperature T1. The controller 100 determines that the first temperature sensor 66 may have failed in a case where the temperature T1 converted from the voltage value Vthm of the first temperature sensor 66 is −25° C. or lower.

Then, the controller 100 determines that the first temperature sensor 66 has failed in a case where a state in which the voltage value Vthm of the first temperature sensor 66 is out of a predetermined range continues for a predetermined time. In the present embodiment, the controller 100 determines that the first temperature sensor 66 has failed in a case where a state in which the temperature T1 converted based on the voltage value Vthm of the first temperature sensor 66 is −25° C. or lower continues for three seconds or longer. In other words, the controller 100 determines that the first temperature sensor 66 has not failed in a case where the temperature T1 is determined to be −25° C. or lower but a state of being equal to or lower than −25° C. does not continue for three seconds or longer.

In a case where the controller 100 determines that the first temperature sensor 66 has failed, the controller 100 stops controlling the lock mechanism 8 based on the voltage value Vthm of the first temperature sensor 66, and controls the lock mechanism 8 based on the voltage value Vthm of the second temperature sensor 68.

Next, an example of cover lock processing executed by the controller 100 in a standby state in which foil transfer processing is not executed will be described with reference to flowcharts in FIGS. 8 to 10.

Figure 8:
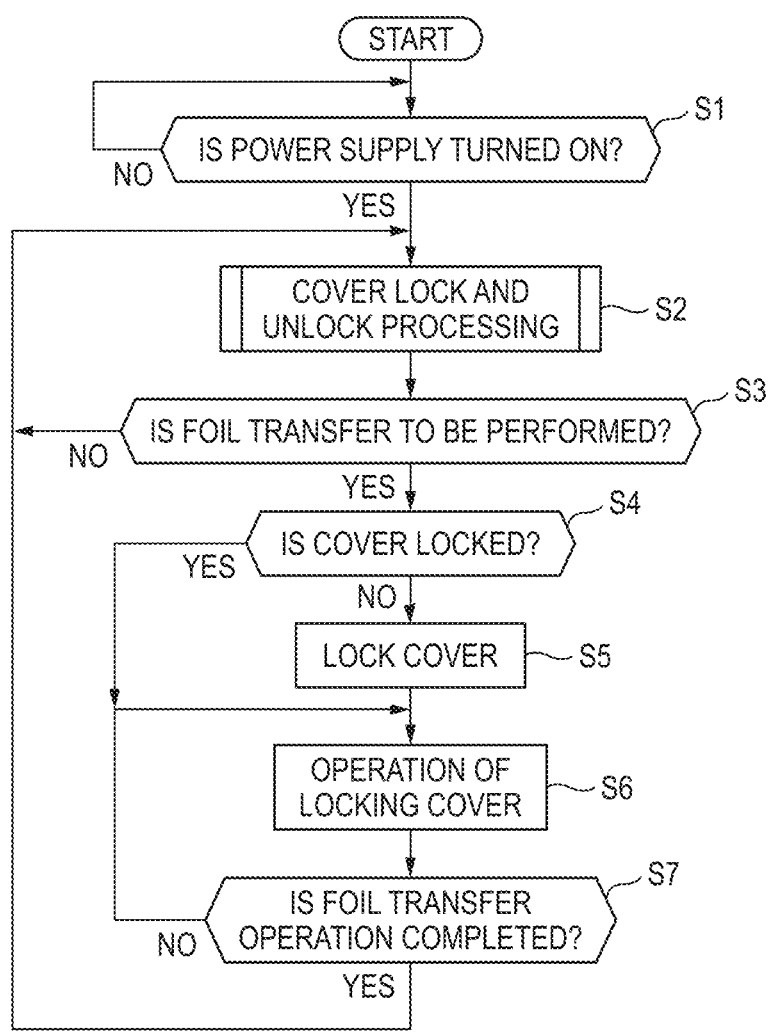

As shown in FIG. 8, in a case where it is determined that the power supply of the foil transfer device 1 is turned on (S1, Yes), the controller 100 executes cover lock and unlock processing (S2).

Figure 9:
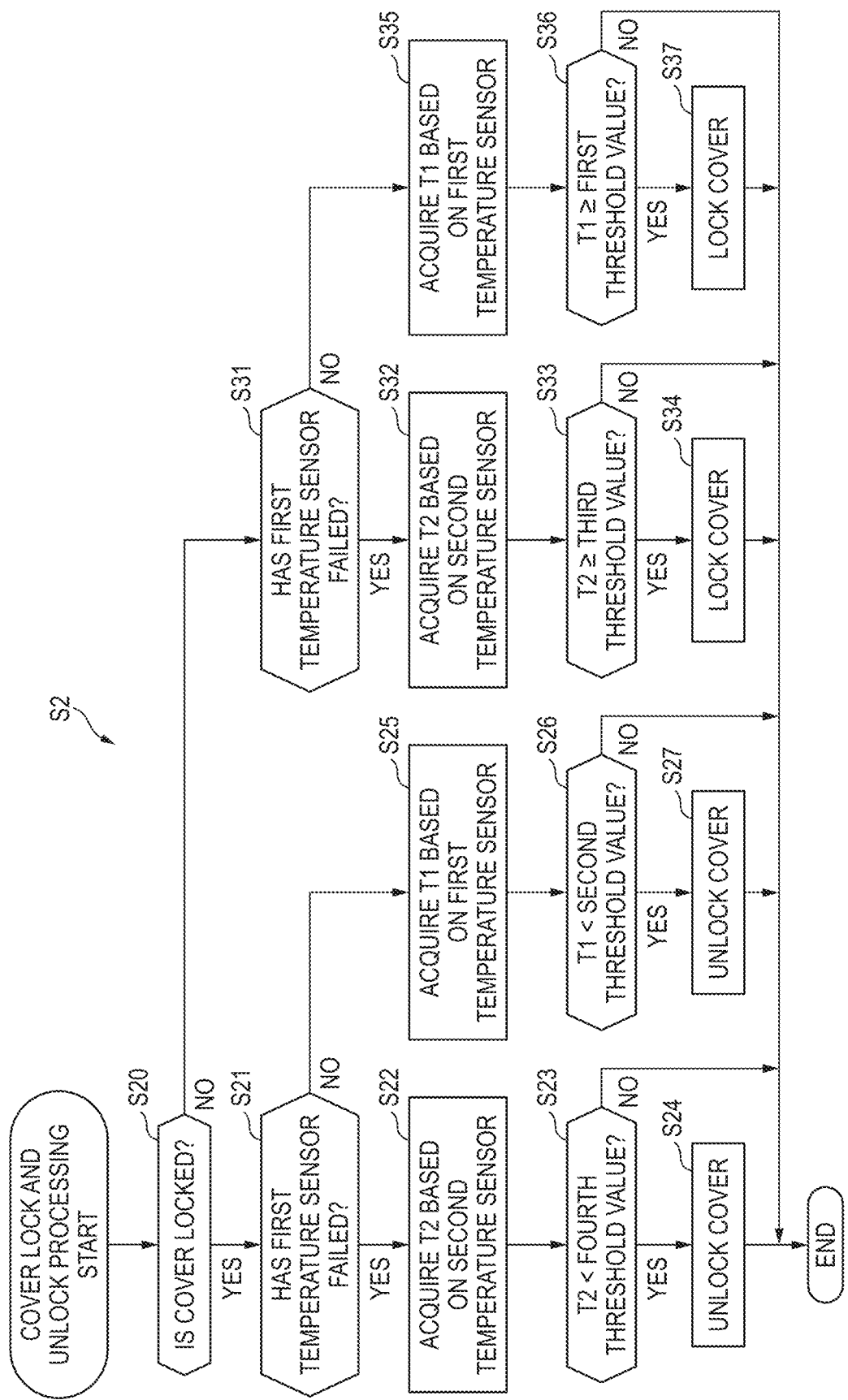
FIG. 9 is a flowchart of cover lock and unlock processing executed by the controller.
Figure 10:
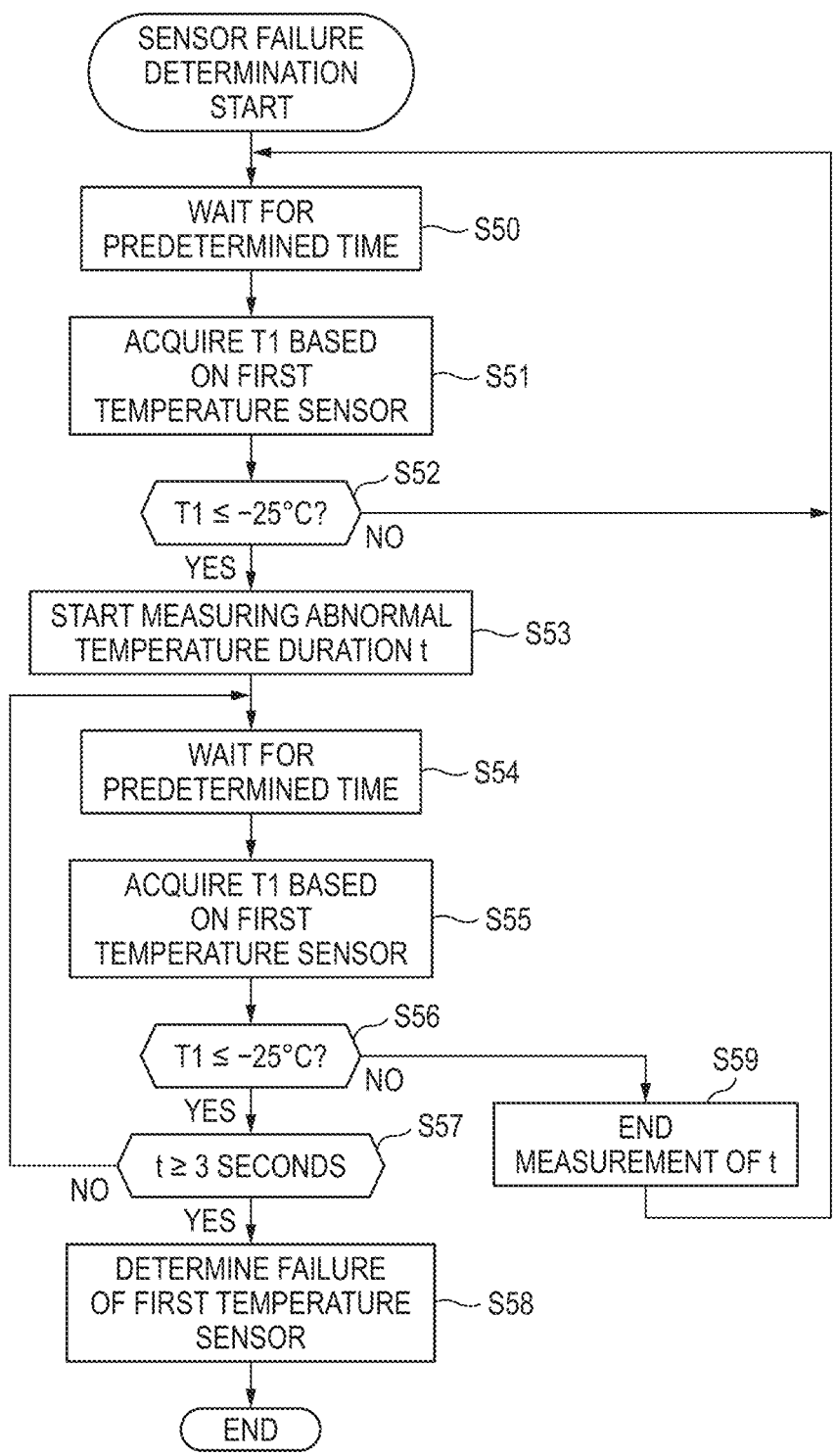
FIG. 10 is a flowchart of sensor failure determination executed by the controller.

As shown in FIG. 9, as the cover lock and unlock processing, the controller 100 determines whether the cover 22 is locked (S20).

In step S20, in a case where it is determined that the cover 22 is locked (S20, Yes), the controller 100 determines whether the first temperature sensor 66 has failed (S21).

In step S21, in a case where it is determined that the first temperature sensor 66 has failed (S21, Yes), the controller 100 acquires the temperature T2 based on the second temperature sensor 68 (S22), and determines whether the acquired temperature T2 is smaller than a fourth threshold value (T2<fourth threshold value?) (S23). The fourth threshold value is a value larger than the second threshold value.

In step S23, in a case where it is determined that the temperature T2 is smaller than the fourth threshold value (S23, Yes), the controller 100 determines that the cover 22 may be opened, unlocks the cover (S24), and ends the cover lock and unlock processing.

In step S23, in a case where it is determined that the temperature T2 is not smaller than the fourth threshold value (S23, No), the controller 100 determines that the cover 22 should not be opened, and ends the cover lock and unlock processing without unlocking the cover.

On the other hand, in step S21, in a case where it is determined that the first temperature sensor 66 has not failed (S21, No), the controller 100 acquires the temperature T1 based on the first temperature sensor 66 (S25), and determines whether the acquired temperature T1 is smaller than the second threshold value (T1<second threshold value?) (S26).

In step S26, in a case where it is determined that the temperature T1 is smaller than the second threshold value (S26, Yes), the controller 100 determines that the cover 22 may be opened, unlocks the cover (S27), and ends the cover lock and unlock processing.

In step S26, in a case where it is determined that the temperature T1 is not smaller than the second threshold value (S26, No), the controller 100 determines that the cover 22 should not be opened, and ends the cover lock and unlock processing without unlocking the cover.

In step S20, in a case where it is determined that the cover 22 is not locked (S20, No), the controller 100 determines whether the first temperature sensor 66 has failed (S31).

In step S31, in a case where it is determined that the first temperature sensor 66 has failed (S31, Yes), the controller 100 acquires the temperature T2 based on the second temperature sensor 68 (S32), and determines whether the acquired temperature T2 is equal to or larger than a third threshold value (T2≥third threshold value?) (S33). The third threshold value is a value larger than the fourth threshold value. The third threshold value is a value larger than the first threshold value.

In step S33, in a case where it is determined that the temperature T2 is equal to or larger than the third threshold value (S33, Yes), the controller 100 determines that the cover 22 should not be opened, locks the cover 22 (S34), and ends the cover lock and unlock processing.

In step S33, in a case where it is determined that the temperature T2 is not equal to or larger than the third threshold value (S33, No), the controller 100 determines that the cover 22 may be opened, and ends the cover lock and unlock processing without locking the cover.

On the other hand, in step S31, in a case where it is determined that the first temperature sensor 66 has not failed (S31, No), the controller 100 acquires the temperature T1 based on the first temperature sensor 66 (S35), and determines whether the acquired temperature T1 is equal to or larger than the first threshold value (T1≥first threshold value?) (S36).

In step S36, in a case where it is determined that the temperature T1 is equal to or larger than the first threshold value (S36, Yes), the controller 100 determines that the cover 22 should not be opened, locks the cover 22 (S37), and ends the cover lock and unlock processing.

In step S36, in a case where it is determined that the temperature T1 is not equal to or larger than the first threshold value (S36, No), the controller 100 determines that the cover 22 may be opened, and ends the cover lock and unlock processing without locking the cover 22.

As shown in FIG. 8, after executing the cover lock and unlock processing (S2), the controller 100 determines whether foil transfer is to be performed (S3).

In step S3, in a case where it is determined that the foil transfer is not to be performed (S3, No), the controller 100 returns to step S2 and executes the cover lock and unlock processing (S2) again. That is, the controller 100 repeatedly executes the cover lock and unlock processing (S2) while the power supply is turned on.

In step S3, in a case where it is determined that the foil transfer is to be performed (S3, Yes), the controller 100 determines whether the cover 22 is locked (S4), in a case where it is determined that the cover 22 is not locked (S4, No), the controller 100 locks the cover 22 (S5), and in a case where it is determined that the cover 22 is locked (S4, Yes), the controller 100 performs a foil transfer operation without performing an operation of locking the cover 22 (S6).

After step S6, the controller 100 continues the foil transfer operation (S6) until the foil transfer operation is completed, and in a case where it is determined that the foil transfer operation is completed (S7, Yes), the controller 100 proceeds to step S2.

The controller 100 repeatedly executes the sensor failure determination while the power supply of the foil transfer device 1 is turned on. As shown in FIG. 10, the controller 100 waits for a predetermined time as the sensor failure determination (S50), and acquires the temperature T1 based on the first temperature sensor 66 (S51).

After step S51, the controller 100 determines whether the acquired temperature T1 is −25° C. or lower (T1≤−25° C.?) (S52). In a case where it is determined that the acquired temperature T1 is not −25° C. or lower (S52, No), the controller 100 determines that the first temperature sensor 66 has not failed, and returns to step S50.

On the other hand, in a case where it is determined that the acquired temperature T1 is −25° C. or lower (S52, Yes), the controller 100 determines that the first temperature sensor 66 may have failed, and starts measuring an abnormal temperature duration t (S53).

After step S53, the controller 100 waits for a predetermined time (S54), acquires the temperature T1 again based on the first temperature sensor 66 (S55), and determines whether the acquired temperature T1 is −25° C. or lower (T1≤−25° C.?) (S56).

In step S56, in a case where the controller 100 determines that the temperature T1 acquired again is not −25° C. or lower (S56, No), the controller 100 ends measurement of the abnormal temperature duration t (S59), and returns to step S50.

In step S56, in a case where it is determined that the temperature T1 acquired again is −25° C. or lower (S56, Yes), the controller 100 determines whether the abnormal temperature duration t is three seconds or longer (S57). In a case where it is determined that the abnormal temperature duration t is not three seconds or longer (S57, No), the controller 100 returns to step S54, and in a case where it is determined that the abnormal temperature duration t is three seconds or longer (S57, Yes), the controller 100 determines that the first temperature sensor 66 has failed (S58) and ends the sensor failure determination.

According to a configuration described above, the following effects may be obtained in the present embodiment.

In the foil transfer device 1 according to related art, a failure of a temperature sensor cannot be determined. Therefore, in a case where the temperature sensor fails, control according to the failure cannot be performed. However, since the controller 100 according to the present embodiment may determine a failure of the first temperature sensor 66 based on the voltage value Vthm of the first temperature sensor 66, the controller 100 may perform control according to the failure.

The controller 100 determines that the first temperature sensor 66 may have failed in a case where the voltage value Vthm of the first temperature sensor 66 is a value out of a predetermined range, that is, −25° C. or lower in the present embodiment. In the present embodiment, the controller 100 determines that the first temperature sensor 66 has failed in a case where a state in which the voltage value Vthm of the first temperature sensor 66 is out of the predetermined range continues for a predetermined time, for example, three seconds or longer in the present embodiment. Therefore, even in a case where it is determined that the voltage value Vthm of the first temperature sensor 66 is out of the predetermined range, the controller 100 determines that the first temperature sensor 66 has not failed unless the state out of the predetermined range continues for the predetermined time, and thus it is possible to prevent the controller 100 from erroneously determining that the first temperature sensor 66 has failed.

In a case where it is determined that the first temperature sensor 66 has failed, the controller 100 controls the lock mechanism 8 based on the voltage value Vthm of the second temperature sensor 68. Therefore, the controller 100 may appropriately control the lock mechanism 8 based on the second temperature sensor 68 even in a case where the first temperature sensor 66 fails. Since the second temperature sensor 68 is not provided in case the first temperature sensor 66 fails, but is for controlling the heating roller 61, there is no need to install an extra temperature sensor to deal with failures.

In a case where the temperature T1 is equal to or larger than a first threshold value, the controller 100 controls the lock mechanism 8 to lock the cover 22, and in a case where the temperature T1 is smaller than a second threshold value that is smaller than the first threshold value, the controller 100 controls the lock mechanism 8 to unlock the cover 22. Therefore, by setting the second threshold value to be smaller than the first threshold value, it is possible to prevent frequent repetition of locking and unlocking of the cover 22.

It should be noted that the present invention is not limited to the above-described embodiment, and may be used in various forms as exemplified below.

Figures 11A, 11B, 11C:
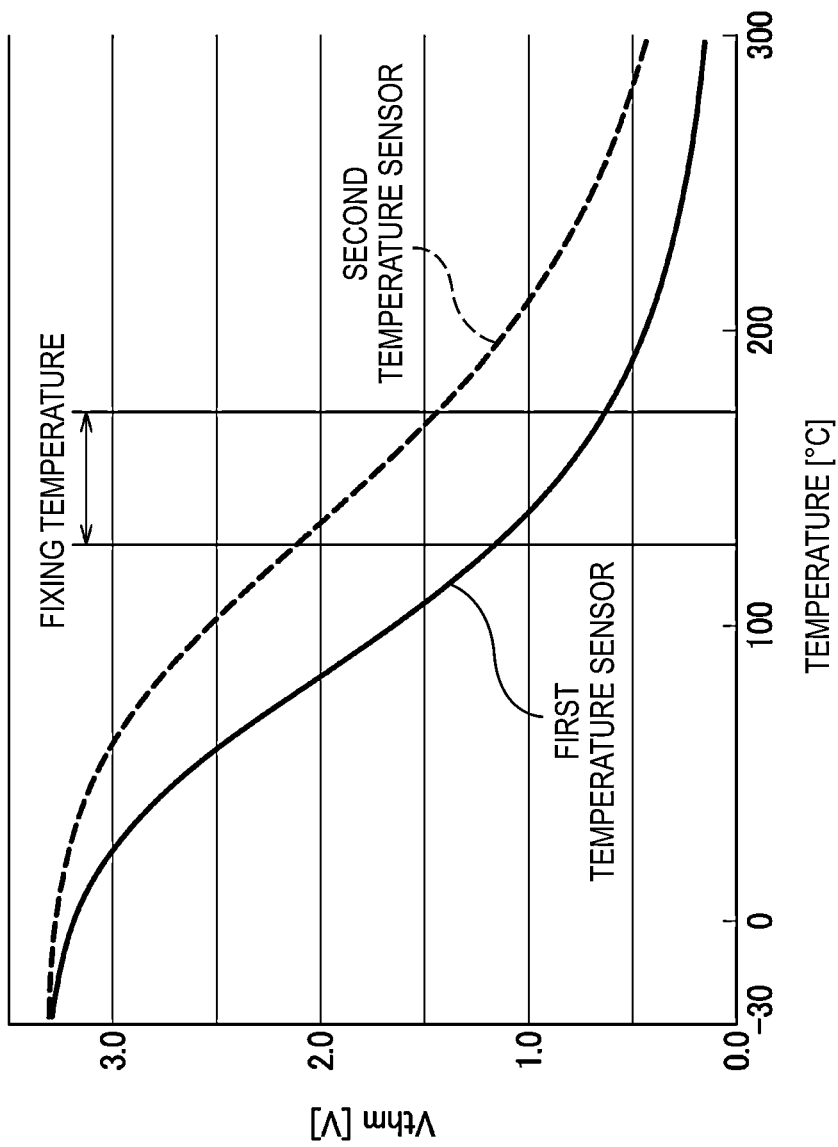
FIG. 11A is a circuit diagram of a first temperature sensor in another embodiment.
FIG. 11B is a circuit diagram of a second temperature sensor in another embodiment.
FIG. 11C is a graph showing relationships between Vthms and temperatures of the first temperature sensor and the second temperature sensor.

In the above-described embodiment, the first temperature sensor 66 is located closer to the input voltage VDD3 than the first resistor 66R between the input voltage VDD3 and the ground GND (see FIG. 7A). The second temperature sensor 68 is located closer to the input voltage VDD3 than the second resistor 68R between the input voltage VDD3 and the ground GND (see FIG. 7B). However, the present invention is not limited to this configuration. For example, as shown in FIG. 11A, the first temperature sensor 66 may be located closer to the ground GND than the first resistor 66R between the input voltage VDD3 and the ground GND. As shown in FIG. 11B, the second temperature sensor 68 may be located closer to the ground GND than the second resistor 68R between the input voltage VDD3 and the ground GND. In such a case, a graph showing relationships between temperatures and voltage values Vthm detected by the first temperature sensor 66 and the second temperature sensor 68 is as shown in FIG. 11C.

In the above-described embodiment, the controller 100 converts the voltage value Vthm of the first temperature sensor 66 into the temperature T1 and determines a failure of the first temperature sensor 66 based on the converted temperature T1. However, the controller 100 may not convert the voltage value Vthm of the first temperature sensor 66 into the temperature T1, and determine whether the first temperature sensor 66 has failed based on the voltage value Vthm of the first temperature sensor 66. Specifically, the controller 100 may determine that the first temperature sensor 66 has failed in a case where the voltage value Vthm of the first temperature sensor 66 is a value out of a predetermined range without converting the voltage value Vthm of the first temperature sensor 66 into a temperature.

For example, in the first temperature sensor 66 in a form shown in FIG. 7A, the controller 100 determines that the first temperature sensor 66 may have failed in a case where the voltage value Vthm of the first temperature sensor 66 is smaller than 0.1V. For example, in the first temperature sensor 66 shown in FIG. 11A, the controller 100 determines that the first temperature sensor 66 may have failed in a case where the voltage value Vthm of the first temperature sensor 66 is larger than 3.3V.

In the above-described embodiment, in a case where the voltage value Vthm of the first temperature sensor 66 is converted into the temperature T1, the controller 100 performs conversion with reference to the table according to the graph in FIG. 7C, but the present invention is not limited to this configuration, and the controller 100 may perform the conversion into the temperature T1 by a calculation formula according to the graph in FIG. 7C.

In the above-described embodiment, the controller 100 converts the voltage value Vthm of the first temperature sensor 66 into the temperature T1 and controls the lock mechanism 8 based on the converted temperature T1. However, the controller 100 may control the lock mechanism 8 based on the voltage value Vthm of the first temperature sensor 66.

In the above-described embodiment, the heating roller 61 is used as the heating member. However, the present invention is not limited to this configuration and the heating member may be a cylindrical fuser film that is slidably supported by a guide member. The heating member may also be a thermal head.

In the above embodiment, the pressure roller 51 is used as the pressure member. However, the present invention is not limited to this configuration and the pressure member may be a belt and a pad.

The elements described in the embodiments and the modifications described above may be combined as desired.

What is claimed is:

1. A foil transfer device configured to dispose a sheet on a foil film containing a foil and transfer the foil onto the sheet, the foil transfer device comprising:
   a heating roller configured to heat the foil film and the sheet;
   a pressure roller configured to nip the foil film and the sheet with the heating roller;
   a first temperature sensor; and
   a controller configured to perform;
   (a) acquiring a voltage value of the first temperature sensor;
   (b) converting the voltage value into a temperature; and
   (c) determining whether the first temperature sensor has failed based on a the temperature.

2. The foil transfer device according to claim 1, wherein the controller determines that the first temperature sensor has failed in a case where the voltage value of the first temperature sensor is out of a predetermined range.

3. The foil transfer device according to claim 1, wherein the controller determines that the first temperature sensor has failed in a case where a state in which the voltage value of the first temperature sensor is out of a predetermined range continues for a predetermined time.

4. The foil transfer device according to claim 1, wherein the controller converts the voltage value of the first temperature sensor into a temperature, and determines a failure of the first temperature sensor based on the converted temperature.

5. The foil transfer device according to claim 4, wherein, the controller performs the conversion of the voltage value of the first temperature sensor into the temperature with reference to a table indicating a relationship between the voltage value and the temperature.

6. The foil transfer device according to claim 1, further comprising:
   a housing main body having an opening;
   a cover movable between a closed position where the opening is closed and an open position where the opening is opened; and
   a lock configured to lock the cover at the closed position, and wherein the controller controls the lock based on the voltage value of the first temperature sensor.

7. The foil transfer device according to claim 6,
wherein the controller stops controlling the lock based on the voltage value of the first temperature sensor in a case where it is determined that the first temperature sensor has failed.

8. The foil transfer device according to claim 7, further comprising:
a second temperature sensor disposed closer to the heating roller than the first temperature sensor and configured to detect a temperature of the heating roller,
wherein the controller controls the lock based on a voltage value of the second temperature sensor in a case where it is determined that the first temperature sensor has failed.

9. The foil transfer device according to claim 8, further comprising:
a metal plate facing the heating roller, extending in a width direction of the foil film, and located downstream of the heating roller in a conveyance direction of the sheet,
wherein the first temperature sensor is disposed on the metal plate.

10. The foil transfer device according to claim 8,
wherein the first temperature sensor is disposed so as not to be in contact with the heating roller, and
the second temperature sensor is disposed in contact with the heating roller.

11. The foil transfer device according to claim 6,
wherein the controller controls the lock to lock the cover in a case where the temperature indicated by the voltage value of the first temperature sensor is equal to or larger than a first threshold value, and controls the lock to unlock the cover in a case where the temperature indicated by the voltage value of the first temperature sensor is smaller than a second threshold value that is smaller than the first threshold value.

12. The foil transfer device according to a claim 1,
wherein the controller determines whether the first temperature sensor has failed before foil transfer for transferring the foil onto the sheet is performed after a power supply of the foil transfer device is turned on.

13. The foil transfer device according to claim 1,
wherein the controller determines whether the first temperature sensor has failed during the foil transfer for transferring the foil onto the sheet.

14. The foil transfer device according to claim 1,
wherein the controller determines whether the first temperature sensor has failed after the foil transfer for transferring the foil onto the sheet is performed.

15. The foil transfer device according to claim 1,
wherein the controller always determines whether the first temperature sensor has failed at predetermined time intervals while the power supply of the foil transfer device is turned on.

16. The foil transfer device according to claim 1, further comprising:
a second temperature sensor disposed closer to the heating roller than the first temperature sensor,
wherein the voltage value of the first temperature sensor is different from the voltage value of the second temperature sensor at 0° C.

17. The foil transfer device according to claim 1, further comprising:
a second temperature sensor disposed closer to the heating roller than the first temperature sensor,
wherein a difference between the voltage value of the first temperature sensor at 0° C. and the voltage value of the first temperature sensor at 1° C. is larger than a difference between the voltage value of the second temperature sensor at 0° C. and the voltage value of the second temperature sensor at 1° C.

18. The foil transfer device according to claim 1,
wherein the voltage value of the first temperature sensor at 0° C. is 0.1V or larger.

19. The foil transfer device according to claim 1, further comprising:
a second temperature sensor disposed closer to the heating roller than the first temperature sensor,
wherein each of the first temperature sensor and the second temperature sensor includes a thermistor whose resistance value decreases as its temperature increases,
a first voltage divider is made of the first temperature sensor and a first resistor,
a second voltage divider is made of the second temperature sensor and a second resistor,
the controller acquires a potential between the first temperature sensor and the first resistor as the voltage value of the first temperature sensor, and
a resistance value of the first resistor is larger than a resistance value of the second resistor.

* * * * *